G. H. WILSON.
GANG-PLOW.
No. 190,460. Patented May 8, 1877.
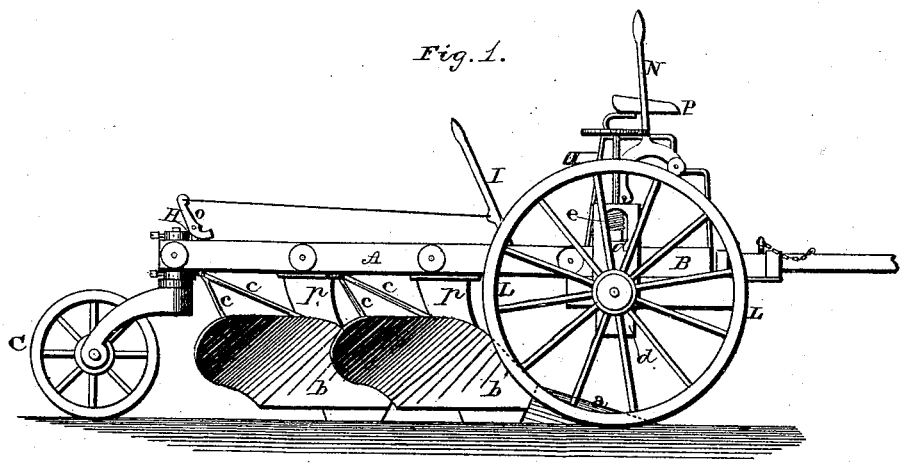
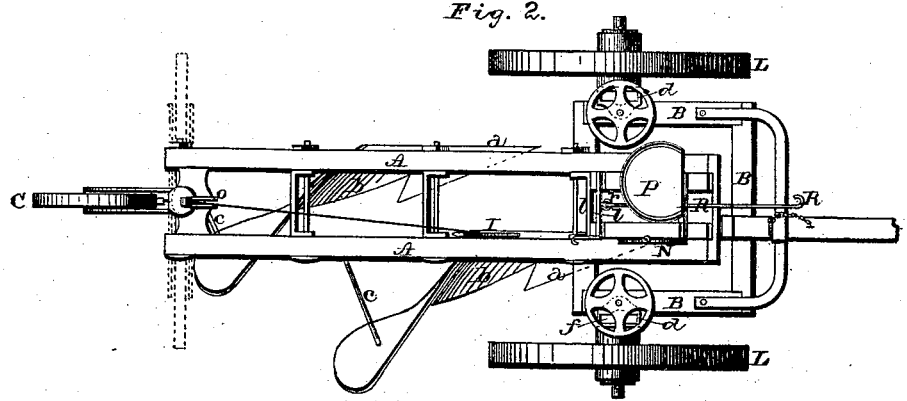
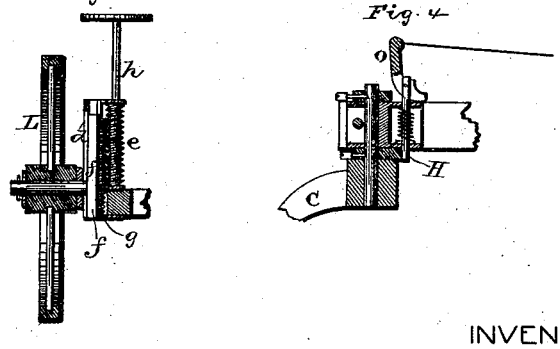
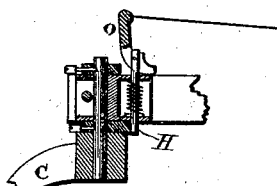
WITNESSES.
J. Wm Garner
C. W. Lemon
INVENTOR
Geo. H. Wilson
per
F. A. Lehmann, Atty.

UNITED STATES PATENT OFFICE.

GEORGE H. WILSON, OF DAVENPORT, IOWA.

IMPROVEMENT IN GANG-PLOWS.

Specification forming part of Letters Patent No. 190,460, dated May 8, 1877; application filed April 19, 1876.

*To all whom it may concern:*

Be it known that I, GEORGE H. WILSON, of Davenport, in the county of Scott and State of Iowa, have invented certain new and useful Improvements in Gang-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in gang-plows; and it consists in the combination and arrangement of parts hereinafter fully described.

The accompanying drawings represent my invention

A represents an oblong frame, the front end of which is supported between the wheels by a square frame, B, which frame is supported by the axles. The two sides of the frame A take the place each of a beam, to which a plow is attached in such a manner as to be laterally adjustable. The plows are provided with long projecting arrow-shaped points or shares $a$, with which the land-sides are made in one piece. The front ends of the mold-boards $b$, where they join the shares, are little more than half the width of the rear end of the shares, while the land-side edges of the mold-boards rise in a straight line to the slanting standards $p$, when they turn outward at an angle of about forty-five degrees, bending over gradually beyond a perpendicular line from the lower edge, so as to form a continuously-increasing convexity in the upper part of the mold-boards to their ends. The under edge of the mold-boards, beginning at the rear sides of the shares, is nearly straight to the end, where it turns upward until the lower and upper edges join, and thus is formed an uninterrupted winding surface from the point of the share to the end of the mold-board. The length of the mold-board and share is divided in nearly equal parts, forward of the standard and back of it, and measures about four feet. The mold-boards and standards are braced by rods $c$, bearing against the beams. At the rear end of the frame A is a spring-catch, H, by which the caster-wheel C, that supports the rear end of the frame, is held in position when required, so that the plows may be backed. This catch is controlled by the cam-lever $o$ attached to it, and, through connection, by the lever I, in reach of the driver. When not held in position for the purpose described the caster-wheel moves freely from side to side, and follows the direction of the plows. To the sides of the square frame B are secured the guides $d$, the inner sides of which guide and support the rods $h$ of the endless screws $e$. Into these guides $d$ are introduced the slides $f$, to the outside of which slides are secured the axles of the wheels L, and to their inner the embedded screws $g$, which screws are thus brought in contact with the endless screws $e$.

The hand-wheels on the rods $h$ are within reach of the driver, who, by turning them, raises or lowers the frame B, upon which the plow-beams rest, and thus regulates the depth of the plowing. At the side of the driver's seat P is the lever N, by means of which the forward end of the frame A is raised, so as to lift the plows entirely out of the ground and above the surface when required. Immediately behind the driver's seat, and projecting from the iron bar $l$, between the sides of the frame A, is a hook, $r$, and to this the draw-bar R is attached, the said bar extending forward as far as the rear end of the tongue.

Having thus described my invention, I claim—

1. The spring-catch H, in combination with the caster-wheel C, substantially as specified.

2. In combination with the frame A, a caster-wheel that is allowed to swing freely around, and that can be locked rigidly in position for the purpose set forth, substantially as specified.

In testimony that I claim the foregoing I have hereunto set my hand this 1st day of June, 1875.

GEORGE H. WILSON.

Witnesses:
H. H. BENSON,
LOVILO H. BROWN.